INVENTOR.
Huberto M. Sierra
BY
Robert H. Fraser
ATTORNEY.

INVENTOR.
Huberto M. Sierra
BY.
ATTORNEY.

INVENTOR.
Huberto M. Sierra
BY
Robert H. Fraser
ATTORNEY.

United States Patent Office 3,063,636

Patented Nov. 13, 1962

3,063,636
MATRIX ARITHMETIC SYSTEM WITH INPUT AND OUTPUT ERROR CHECKING CIRCUITS

Huberto M. Sierra, Santa Clara, Calif., assignor to International Business Machines Corporation, New York, N.Y., a corporation of New York Filed July 6, 1959, Ser. No. 825,038
8 Claims. (Cl. 235—153)

This invention relates to digital computing systems, and more particularly to digital arithmetic units which utilize error checking features to insure accurate and reliable high speed operation.

Arithmetic units form a central operative part of most modern digital data processing systems. As such digital systems perform repetitive or programmed routines, the arithmetic unit is used repeatedly and in a number of different ways. Thus, the speed and reliability of an arithmetic unit may in large measure determine the quality of performance of the system. Accordingly, efforts are continually being made to enhance the operative speed and reliability of the arithmetic units used in modern digital systems.

A particularly useful and high speed form of arithmetic unit employs matrices of bistable elements which are arranged to form an arithmetic table. The matrices are defined by rows of input conductors which thread the bistable elements in two coordinates so that each bistable element is at a unique defined position. The bistable elements are operated only when signals are present on more than one of the input conductors which are threaded therethrough. Consequently, variables may be represented by signals on conductors in each of the two coordinates, an arithmetic function may be derived from the location in the matrix of the bistable element corresponding to the two input variables.

Such matrices of bistable elements, which may also be considered to be planes of elements, are readily provided by magnetic core matrices which operate with coincident current energization. These matrices are in some instances utilized to provide arithmetic functions, as for example, addition or multiplication.

While arithmetic units which utilize such planes of bistable elements are capable of high speed operation, it is always desirable to be able to enhance the reliability of such units. It is important, for example, to determine whether an error has occurred in providing an input to the arithmetic unit, and also when an error has occurred in the output which is provided by the unit. It is particularly desirable that such checking be accomplished without increasing the complexity or cost of the system to any appreciable extent, and that no limitation be imposed on the speed of the system because of the presence of the checking system.

As a specific example, many general purpose data processing systems require an arithmetic unit which can add binary coded decimal digits to provide a like coded output. In view of the constructional and operative advantages of magnetic core matrices, it is desirable to utilize such matrices to perform the addition function. Errors which might affect the result, whether occurring at input or output, should be detected and indicated, but the use of such matrices should not introduce complexities into the system.

It is therefore an object of the present invention to provide an improved arithmetic unit having a combination of speed and reliability which is superior to the units heretofore available.

Another object of this invention is to provide an improved arithmetic unit for digital data processing systems, which arithmetic unit utilizes magnetic core matrices to provide high speed operation but which incorporates automatic error checking features.

Yet another object of this invention is to provide an error checking circuit for digital computing systems utilizing arithmetic units having planes of bistable elements.

A further object of this invention is to provide an arithmetic unit which has a superior combination of speed, accuracy and reliability and provides a binary coded decimal output.

In accordance with the invention, an arithmetic unit such as an adder may be arranged in conjunction with a matrix of magnetic cores. One of a number of addressing conductors extending in rows in one coordinate direction for the matrix may be individually energized to provide an augend factor. At the same time one of a number of conductors extending in rows in the other coordinate direction may be energized to provide an addend factor.

A number of output circuits are used, each threading a number of the magnetic cores in a selected pattern and each corresponding to a different binary value in a binary coded decimal output. Each of the magnetic cores may thus be considered to have an assigned sum value, determined by the sum of the two input variables represented by the corresponding input conductors. The digital output circuits which thread each of the magnetic cores consist of those output circuits which together make up the binary number equal to the assigned value for the core. Consequently, when the state of the cores is read, the one core which has been operated energizes the output circuits threaded therethrough to provide binary coded decimal sum outputs. Moreover, the accuracy of this output is checked through the use of an additional parity winding which threads all the cores which have an even number of output digit windings, so that each core has an odd total number of output digit windings.

A parity checking circuit coupled to the output digit windings and to the additional winding indicates the occurrence of an even total number of output signals, and thus indicates the occurrence of an error in the output signal. A check for the possibility of error in the input signals is provided through the use of a pair of sensing cores, each of which is coupled to all of the input conductors in one of the coordinates. If more than one input conductor in a given coordinate is energized, the associated sensing core will be operated, and this condition is detected to provide an output which represents the occurrence of an error in the input information. Consequently, the system operates with high reliability and accuracy without affecting the speed of the arithmetic operation and without materially increasing the complexity or cost of the system.

A better understanding of various features of the present invention may be gained by reference to the accompanying description, taken in conjunction with the drawings, in which like reference numerals refer to like parts, and in which.

The present illustration of how the invention may be employed describes an arithmetic unit for a digital computing system, the arithmetic unit being specifically an adder. This adder is to operate upon information in binary coded decimal form, and to provide similarly coded information as output. For clarity, a number of related units and functions which are commonly found in computing systems have been omitted. Thus, program control circuits and various other forms of timing circuits, and circuits for the storage of information, have not been shown. It will be assumed, however, that the arithmetic unit illustrated operates in cyclic fashion and that quantities to be added are provided by the system at selected time intervals.

Figure 1:
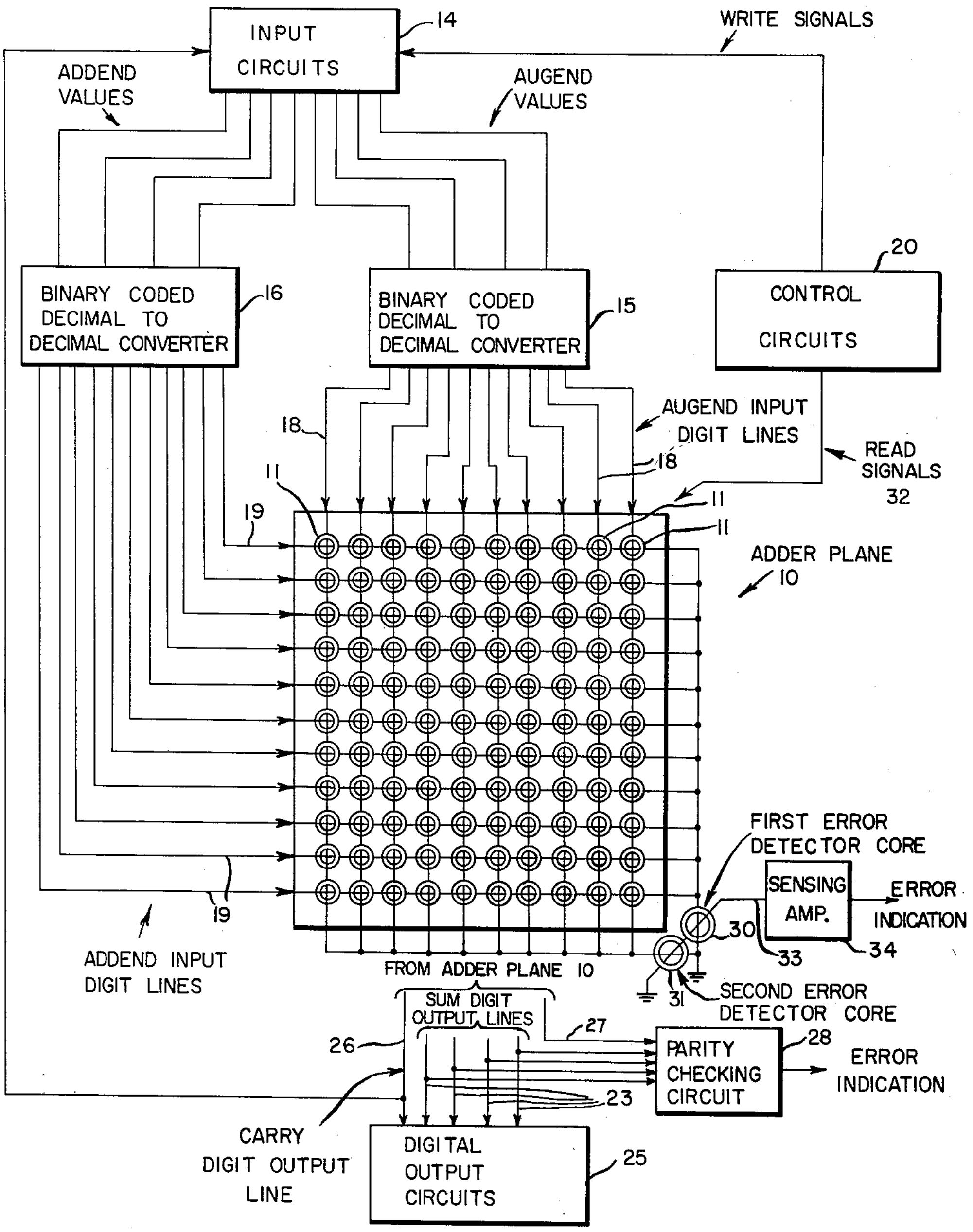
FIG. 1 is a block diagram representation of an adder system employing error checking features in accordance with the present invention, which adder system utilizes a plane of bistable elements.

The relationship of the principal elements of a system in accordance with the invention is shown in FIG. 1, to which reference may now be made. An adder plane or matrix 10 consisting of a rectangularly disposed array of bistable elements 11 provides the central operating unit for the system. The bistable elements 11 are preferably magnetic cores of the type to be described in more detail in conjunction with FIGS. 3 and 4. These magnetic cores 11 may be used in a number of different structures, but are conveniently addressed and operated if disposed in rectangular coordinates. For convenience, these coordinates may be considered to be defined by vertical columns and horizontal rows, taking the relative position of FIG. 1 as a frame of reference. An input conductor lies along each column and also along each row, the entire arrangement or matrix constituting a planar structure which may be referred to as an adder plane.

The input variables which are to be added consist of a augend and an addend which may be provided in binary coded decimal form from input circuits 14 which represent generally the most directly associated elements in the digital computing system. Numbers expressed in binary coded decimal form, as in the present example, may be represented by parallel signals on a number of lines, each of which has a binary weight or value in the binary number system. Thus, the augend and addend values are provided from the input circuits 14 on two sets of parallel lines, each of which consists of four conductors.

These binary coded decimal augend and addend signals are converted to decimal form by first and second binary-coded-decimal to decimal converters 15 and 16, respectively. Such converters are well known circuits and operate to provide a decimal value signal on one out of a number of conductors, there being at least ten conductors for decimal notation.

Augend values are thus provided by signals on one out of ten input digit lines 18 which are the outputs from the first binary-coded-decimal to decimal converter 15. These input digit lines 18 for the augend values provide the conductors or windings which thread the magnetic core bistable elements 11 to define the vertical columns in the corresponding coordinate of the adder plane 10. Addend values are provided on one out of eleven input digit lines 19 from the second binary-coded-decimal to decimal converter 16. An additional (eleventh) line is utilized for addend values, in order to include carries from previous addition operations. The input digit lines 19 which carry the addend values are the windings which thread the bistable elements 11 in the adder plane 10 in horizontal rows, thus defining the other coordinate of the matrix.

The bistable elements 11 in the adder plane 10 are individually operated or changed in bistable state by the coincident current technique. Whenever an element 11 lies at the intersection of conductors which are energized at the same time, that element may be switched from one stable state to another without affecting the other elements 11. The operation of a selected element 11 is equivalent to the "writing" in of information, write signals being provided to the input circuits 14 from control circuits 20. The control circuits 20 also provide read signals to the adder plane 10 for the purpose of determining the element 11 which has been operated.

The outpt signals which are provided from the adder plane 10 are derived in a fashion which is described in more detail in conjunction with FIG. 2 below. These output signals, however, are provided principally on sum digit output lines 23 which are coupled from the adder plane 10 to digital output circuits 25. The sum digit output lines 23 carry parallel signals which represent binary coded decimal information. In addition, the outputs from the adder plane 10 include a carry digit output line 26 which is coupled to the input circuits 14 to provide a carry signal for the next succeeding addition operation.

A first error detecting conductor or parity winding 27 coupled in a selected fashion to the elements 11 in the adder plane 10 is also coupled to a parity checking circuit 28 in parallel with the sum digit output lines 23. The first error detecting conductor 27 thus provides a parity bit in parallel with the sum digit signals on the output lines 23. The parity checking circuit 28 (a number of alternative forms of which are known) provides an error indication whenever the parallel signals provided to it do not have a selected odd or even characteristic. In the present instance, an odd parity check is desired. Therefore, the total number of signals provided in parallel to the parity checking circuit 28 is always odd when the system is operating correctly.

A second error detection circuit is provided by first and second error detector cores 30 and 31, each of which is coupled to all of the conductors in a selected coordinate group in the adder plane 10. Specifically, the first error detector core 30 is coupled by a common connection to each of the conductors or input digit lines 19 which thread the bistable elements 11 in the horizontal rows. The second error detector core 31 is coupled by a common connection to each of the input digit lines 18 which thread the elements 11 in the vertical columns. Each of the error detector cores 30, 31 is operated, as are the bistable elements 11, when more than one of the associated conductors is energized. Diodes or other rectifying elements to prevent the passage of transient currents have not been illustrated but may be used if desired. Operation of either one or both of the error detector cores 30, 31 is determined by a sensing winding 33 coupled to both of the cores, and a sensing amplifier 34 which provides an error indication signal.

Figure 4:
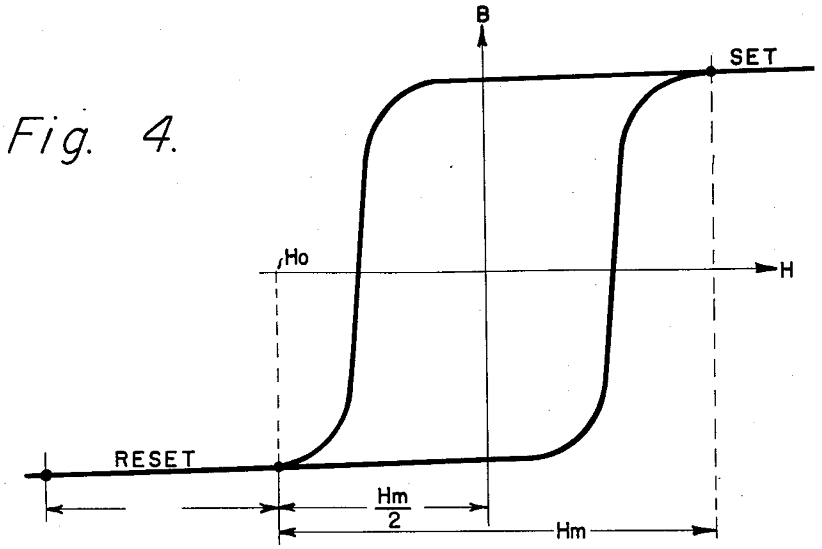
FIG. 4 is a representation of the hysteresis loop of a typical bistable element as employed in the arrangement of FIG. 1.
Figure 3:
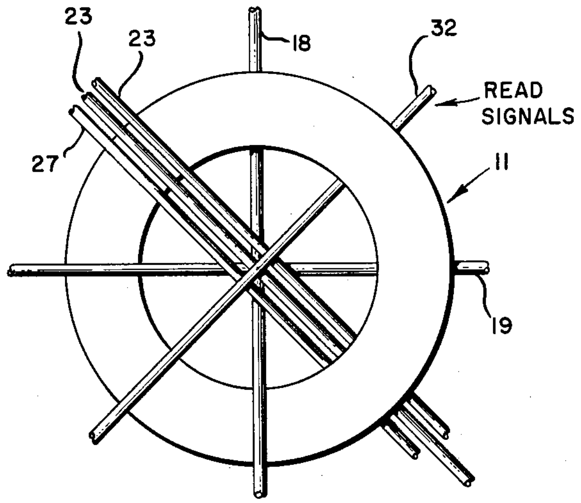
FIG. 3 is a fragmentary and simplified view of a bistable element which may be employed in the arrangement of FIG. 1.

The arrangement and operation of the bistable elements 11 may be understood by a brief reference to FIGS. 3 and 4, which illustrate respectively an enlarged view of an element 11 and a typical hysteresis curve therefor. As may be seen in FIG. 3, the element 11 may consist of a magnetic core which has a generally toroidal shape and is threaded by a number of conductors which are inductively coupled to the core 11. The inputs provided to the core consist of the input digit lines 18 and 19 and a conductor 32 for read signals.

Referring to FIG. 4, as well as FIG. 3, there is shown a typical hysteresis curve for the material employed in the core 11 which indicates a markedly rectangular characteristic. The magnetization of the core 11 may be considered to vary between a "set" and a "reset" condition, the reset here being taken as the initial state of operation. The core 11 thus is initially driven to beyond saturation in the reset direction. A magnetomotive force of $$\frac{H_m}{2}$$

does not substantially change the magnetization of the core because of the rectangular hysteresis characteristic. A magnetomotive force of $H_m$ is sufficient to drive the core to saturation in the set direction, and thus to change its direction of magnetization. Accordingly, the magnetosignals will be induced concurrently, in parallel, in such of the sum digit output lines 23, the carry digit output line 26 and the first error detector or parity conductor 27 as thread the bistable element 11. These output signals, it will be noted, are again in the binary coded decimal form which is desired for further utilization in the system.

A simple example of the addition process for specific numbers may now be provided. Let us assume that the augend value is a decimal six, and the addend value which is to be added thereto is a decimal seven. The sum, or decimal thirteen, is represented in the adder plane 10 by a bistable element having assigned binary value of — 1, 2. The element 11 lies in the carry half of the plane 10. Thus, the selected core 11 is threaded by sum digit output lines 23 which designate the binary weights of one and two, and is also threaded by the carry digit output line 26. Inasmuch as an odd parity check is to be performed, the core also is threaded by the parity conductor 27 to provide a total odd number of bit lines which thread the core. On readout of the state of the core, signals are provided to designate a carry for the next addition operation, to designate the binary values one and two, and to designate the existence of the parity bit. In the next addition step, the carry digit is added into the addend value as the cycle is repeated.

The error checking features of this arrangement operate automatically and without special provisions which require time or additional circuitry being needed as far as the adder circuits themselves are concerned. These circuits operate to detect errors at the output of the system, and also to detect errors which might occur and have an effect upon the provision of a correct answer without being detected at the output. In a sense, therefore, there may be said to be a check of the correctness of both the output and the input.

Although the inputs to the adder plane 10 are checked for accuracy, the operation of the adder plane 10 is independent, and as with any independent system, may introduce errors which are not affected by the inputs. Thus, an imperfect connection may cause a binary digit signal to be missed, or a transient effect may result in the addition of an erroneous digit. Both of these errors will be detected by the parity checking circuit, 28, because each causes an even number of digits to be provided in the output. Thus, the parity check is a check of the plausibility or the validity of the result answer, when including the parity bit but excluding the carry digit. With magnetic core systems, such a check is suitable for detecting most of the types of malfunctions which can occur.

One type of error which might occur in the output and which would not in all instances be detected by the parity checking system is dependent upon erroneous operation of more than one input line in a group. If two input conductors in one coordinate are concurrently energized, two cores 11 in the adder plane 10 will be operated. Such an error will not be detected by the parity checking circuit 28 if the output signals including the parity signal come to an odd total. Thus, if one core 11 having the assigned binary value of — 1, without a parity bit, and another core 11 having the assigned binary value of — 1, 2 and a parity bit are both energized, the result will be — 1, 2 and a parity bit. This odd-valued result will not be detected by the parity checking circuit 28, but will be detected by the first or second error detector core 30 or 31. The associated error detector core 30 or 31 will be actuated by the presence of two concurrent signals, and during readout will provide a signal to the associated sensing amplifier 34. Accordingly, such errors are determined readily and rapidly without the need for additional circuitry.

Although there has been described above and illustrated in the drawings a particular arrangement of an improved arithmetic system for digital computing systems which operates with extremely high speed and accuracy under virtually all conditions of operation, it will be appreciated that the invention is not limited to the specific illustrative arrangement. Accordingly, any modifications, variations or equivalent arrangements falling within the scope of the annexed claims should be considered to be a part of the present invention.

What is claimed is:

1. An error checking system for an arithmetic unit which utilizes a matrix of coincidentally addressed bistable elements to perform an arithmetic function, with each of the elements having an assigned value, the system comprising in combination a number of sensing circuits, each of the sensing circuits being coupled serially to a number of the bistable elements, the sensing circuits which are coupled to each bistable element being arranged to provide a binary coded representation of the value assigned thereto, a first error detecting arrangement including an additional sensing circuit which is coupled serially to selected ones of the bistable elements so as to provide a selected like odd or even total number of sensing circuits coupled to each of the bistable elements, and a second error detecting arrangement including means coupled to the matrix for detecting coincident addressing of more than one of the bistable elements.

2. An error checking system for an arithmetic unit which utilizes a matrix of coincidentally addressed bistable elements to perform a desired arithmetic function, with each of the elements having an assigned value corresponding to its position in the matrix and the arithmetic function being performed, the system comprising in combination addressing circuit means including a number of conductors coupled to the bistable elements to provide coincident addressing thereof, a number of binary digit sensing circuits coupled in selected patterns to the bistable elements, the sensing circuits which are coupled to each bistable element being arranged so as to provide a binary coded representation of the value assigned thereto, a first error checking circuit including an additional sensing circuit which is coupled to selected ones of the bistable elements so as to provide that each bistable element is coupled to a number of sensing circuits which together have a like odd or even characteristic, a parity checking circuit coupled to the sensing circuits for detecting the absence of the desired odd or even characteristic in the digital signals being sensed, and a second error checking circuit including at least one coincidently addressed bistable element coupled to the conductors of the addressing circuit means and arranged to be operated when more than one of the conductors is energized.

3. A data handling system for performing a mathematical function and including in combination a matrix of bistable elements having different valued input conductors representing a first factor threaded therethrough in rows in one coordinate direction and also different valued input conductors representing a second factor threaded therethrough in rows in another coordinate direction, one conductor from each coordinate direction threading each of the magnetic bistable elements and currents on both of the conductors acting to operate the associated bistable element, a number of output circuit conductors threaded through the bistable magnetic elements, the output conductors threading each individual magnetic element representing a mathematical function determined by the factors represented by the associated input conductors, a first error sensing circuit including an additional output conductor threading the bistable magnetic elements so as to provide a selected odd or even characteristic in the total number of output conductors threading each bistable magnetic element, means coupled to each of the magnetic bistable elements for energizing the output conductors associated with an operated magnetic bistable element, and a second error sensing circuit including a pair of magnetic bistable elements coupled to the groups of input conductors corresponding to the first motive force which is induced in the core 11 by a single input line is arranged to correspond to $$\frac{H_m}{2}$$

Therefore, coincident signals on the two input lines 18 and 19 are required to "operate" the bistable core and thus change it from the reset to the set condition.

In this example, the condition of a core 11 is read or utilized by signals applied on the read input line 32 which return the core to the reset condition. In resetting, the core induces currents in the associated output lines, as illustrated in FIG. 4. By way of example, two sum digit output lines 23 and an additional error detector or parity conductor 27 thread the core 11. No carry line has been illustrated in this example. During the read operation, therefore, output signals are induced in the output lines 23 and in the parity conductor 27. The capability which the core 11 has for being sensed by a number of output conductors is made use of in the present arrangement to insure greater reliability and system accuracy.

The bistable operation of the cores may thus be seen to be essentially binary in nature. Toroidal magnetic cores need not be utilized necessarily, however, because a number of magnetic elements of different configuration are known which can provide the same functions under like conditions of operation. It may also be seen that any matrix arrangement using coincidentally addressed elements and capable of providing outputs on a number of lines may be used. The elements need not be magnetic.

Operation of the adder plane 10 is combined with automatic error checking features without loss of speed because of the manner in which the various output or sensing windings are arranged with respect to the bistable elements 11. The manner in which the various conductor windings are coupled to the different elements 11 is illustrated in FIG. 2, although for clarity only representative portions have been illustrated in detail. First, it should be noticed that each bistable element 11 has an assigned numerical value. The numerical values are determined by the arithmetic function which is being performed and the two variables represented by the input lines at each bistable element 11. In this example, the assigned value at each bistable element corresponds to the binary sum of the decimal inputs which are coupled to that element. For example, the binary sum at the intersection of the column having a numerical value four and the row having the numerical value three is the binary quantity—1, 2, 4. This corresponds to the decimal value seven. Of the four output digit lines 23, signals are provided only on the lines which represent the binary digits, usually called bits, which correspond to the one, two and four bit values.

Only the one-valued output digit line 23 has been fully illustrated by a dotted line, indicating the elements 11 to which it is inductively coupled. It will be appreciated, however, that the other conductors 23 are similarly coupled to a number of bistable elements 11 but in different patterns. The one-valued bit line is inductively coupled to each of the magnetic bistable elements 11 which have a one digit in its assigned arithmetic value. The two-valued bit line is inductively coupled to each of its bistable elements which has the binary digit two in its assigned binary value, and so on.

Decimal values of zero are indicated in the present arrangement by the binary value two, eight. This value can be converted to a decimal zero by the associated conversion equipment, and thus there is no need for a fifth, zero valued, output digit line. Carry values are, however, detected by a separate carry winding which includes all the bistable elements 11 whose assigned value is a decimal 10 or greater. Accordingly, the plane 10 is divided by a heavy line A—A' into a no carry portion and a carry portion. The carry conductor 26 threads all of the bistable elements 11 in the carry portion, but has not been shown except at the output, for the sake of simplicity. Likewise, the read winding 32, which threads all the elements 11 has also been omitted.

Because a carry from the previous addition operation may have been provided back to the input circuits, the addend value being combined therewith may be a decimal ten. Accordingly, there are eleven addend lines, the highest of which has a decimal ten value.

The first error detecting circuit includes the error detecting or parity conductor 27 threaded in a selected manner through the bistable elements 11 in the adder plane 10. As stated above, the first error detecting conductor 27 provides a parity bit on a line which is parallel to the sum digit output lines 23. The parity which is chosen is odd, so that the first error detector conductor 27 is coupled to all bistable elements 11 which are coupled to an even number of sum digit output circuits 23. Thus, no matter which of the bistable elements 11 is operated, an odd total number of output conductors 23 and 27 will always be energized if the system is operating correctly. In thus providing an odd parity check, the system does not utilize the carry digit output line 26.

The second error detecting circuit includes the first and second error detector cores 30 and 31, each of which is threaded by the common return of all of the input digit conductors 18 or 19 in a separate coordinately disposed group. Thus, the first error detector core 30 is threaded by the input digit lines 18 which extend in the vertical columns. The error detector cores 30 and 31 are arranged to be inductively coupled to the associated conductors and to be actuated by magnetomotive forces of magnitude like that needed for the bistable elements 11. That is, a signal on one of the conductors alone is not sufficient to change the magnetization of one of the cores 30 or 31 to its other bistable state. Two concurrent signals in the same group of input digit lines 18 or 19, however, are sufficient to change the magnetization state. When thus operated from one state to another, the cores 30 and 31 induce currents in the sensing winding 33, which results in the provision of an error indication signal from the coupled sensing amplifier 34.

Figure 2:
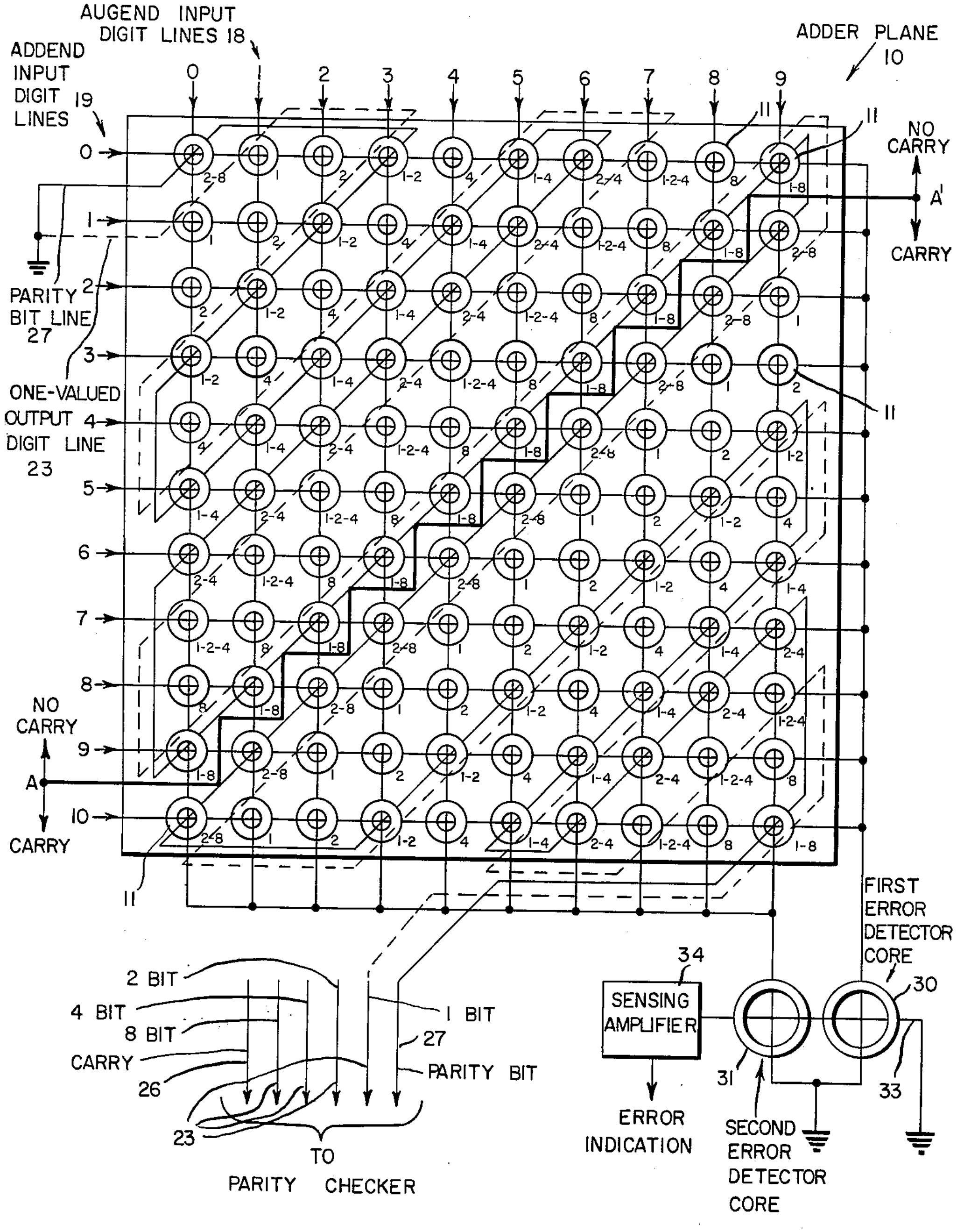
FIG. 2 is a simplified and schematic representation of a plane of bistable elements as disposed for use in the arrangement of FIG. 1.

Addition is performed by the systems of FIGS. 1 and 2 through the operation of the adder plane 10, which selects a sum value corresponding to the input variables. The inputs are provided as binary coded decimal signal patterns from the input circuits 14, the augend and addend values being converted to corresponding decimal values by the first and second binary-coded-decimal to decimal converters 15 and 16. Thus, a current in one of the group of input digit lines 18 represents the augend, and a current in one of the other group of input digit lines 19 represents the addend. These input digit lines 18 and 19 are also the addressing conductors for the adder plane 10. The only magnetic bistable element 11 in the adder plane 10 which is operated (caused to reverse its sense of magnetization from its original sense) is that bistable element 11 at the intersection of the two current carrying lines 18 and 19 in the two coordinates. Thus, this operation constitutes the use of the adder plane 10 as a mathematical table or reference which provides the desired mathematical function of addition.

The timing of this write-in operation is controlled by write signals which are applied to the input circuits from the control circuits 20. After a desired bistable element 11 in the adder plane 10 has been operated, a read signal is provided to all of the elements 11 by a read winding, as described above in conjunction with FIG. 3. The read signal provides a magnetomotive force which is sufficient to return any operated element 11 to its initial or reset condition. In the process of thus resetting an operated bistable element 11, only that element will induce an output signal in the associated output windings. The output and second factors respectively and arranged to be operated when a signal is provided on more than one of the conductors in the group.

4. A data handling system for performing a mathematical function and providing a result corresponding to two input variables, the system including in combination a matrix of magnetic elements, a first group of input conductors each threading the magnetic elements in a different row in one coordinate direction, the input conductors representing different values of a first variable, a second group of input conductors threading the magnetic elements in different rows in a second coordinate direction, the conductors of the second group representing different values of a second variable, each magnetic element being arranged to be operated when both of the associated input conductors are energized, a number of output conductors, each threading various of the magnetic elements in a selected binary-valued pattern, the output conductors taken together at each of the magnetic elements providing the desired mathematical result of the two input variables at that magnetic element position, the total number of output conductors being odd or even as selected, at each element, an additional output conductor coupled to selected ones of the magnetic elements to provide a selected odd-even characteristic which is alike in all the magnetic elements, a parity checking circuit coupled to the output conductors to indicate error if the established odd-even characteristic is not provided in the output conductors, and error detecting means including a pair of magnetic elements, each coupled to a different group of input conductors for detecting the energization of more than one input conductor in the associated group.

5. An arithmetic system for providing an arithmetic operation on numbers representated by the presence of a pulse on one of a plurality of input digit lines, the system comprising a matrix of bistable magnetic cores, first and second sets of input digit lines representing the numbers to be operated upon, the first and second sets of inputs digit lines threading the cores of the matrix in corresponding coordinates, so that a predetermined core having a selected binary arithmetic value is selected in the matrix for each combination of inputs, a number of output digit lines, the output digit lines each being inductively coupled to a number of cores in the matrix, each of the output digit lines representing a different binary value and threading the cores in the matrix which include the corresponding binary quantity in the arithmetic value represented by that core, an output parity line threading selected ones of the cores in such manner that there is an odd number of output digit lines at each of the cores when including the parity line, a parity checking circuit coupled to the output digit lines and the parity checking line, a pair of error checking bistable magnetic cores, each coupled to a different one of the first and second sets of input digit lines, and each arranged to be operated when a signal is present on more than one of the input digit lines of the corresponding set, and means for detecting operation of at least one of the error sensing bistable magnetic cores.

6. A system for providing binary coded decimal sum outputs from binary coded decimal augend and addend values and comprising in combination first and second converters for providing decimal augend and addend value signals, respectively, on individual conductors out of a group, a plane of coordinately addressed memory elements, each of the memory elements being coupled to a different conductor from each of the converters, the two conductors at each element representing a unique pair and both together when energized operating the associated element, a number of digit sensing windings each coupled in series to a grouping of the memory elements, so that signals on the digit sensing windings taken together provide binary coded decimal outputs representative of the sum of the augend and addend values of the conductors at an operated core, an additional sensing winding coupled in series fashion to those memory elements which have selected odd-even numbers of digit sensing windings to provide an odd-even characteristic which is alike for all the memory elements, a parity checking circuit responsive to the digit sensing windings and the additional sensing winding, and a pair of sensing elements each coupled to the conductors from a different converter and responsive to signals provided thereby to be operated whenever more than one conductor of a group carries signals.

7. A digital adder circuit comprising a first input circuit having a number of conductors and providing signals representing augend values on selected ones of the conductors, a second input circuit having a number of conductors and providing signals representing addend values on selected ones of the conductors, a matrix consisting of bistable magnetic cores and coordinately arranged addressing conductors, each of the cores being threaded by a different one addressing conductor from each coordinate, so that each core has a positional value defined by the coordinate positions of the associated conductors, the individual conductors in each coordinate direction being coupled to different individual conductors in one of the input circuits, so that the positions occupied by the cores define values which constitute the sums of the augend and addend represented by the associated conductors, a number of binary-valued output circuits threading the cores in selected patterns, each output circuit coupled to the cores representing a selected like binary sum digit, the digits corresponding to each output circuit having a binary progression, a first error checking circuit including a sensing conductor threading the cores which have an even number of binary digits as represented by the output circuits threaded therethrough, an odd parity checking circuit coupled to the output circuits and the sensing conductor, and a second error checking circuit including a pair of sensing cores, each of which sensing cores is threaded by all of the conductors of a different input circuit, and each of which is operated by energization of more than one of the conductors to provide an indication of erroneous operation.

8. A decimal adder circuit for providing high speed and reliable addition of decimal digits which are expressed in binary coded decimal form, the circuit comprising input circuits for concurrently providing binary coded decimal augend and addend values, first and second binary-coded-decimal to decimal converters for providing decimal valued signals on one out of ten and one out of eleven conductors, respectively, a matrix of magnetic cores arranged in coordinate rows of ten and eleven, respectively, with the individual conductors of the first and second converters threading the cores in individual rows in the different coordinate directions such that each core is threaded by one conductor from each converter and operated only when both conductors carry signals, the cores thus having uniquely defined positions representative of the sum of the augend and addend values of the corresponding conductors, a group of sum digit sensing windings, each of the sensing windings representing a different binary digit and threading the cores representing sums which include that binary digit, a carry winding threading the cores representing the sums which include a decimal carry, a parity winding threading all cores representing sums which include even numbers of binary digits, read circuits coupled to the cores for resetting operated cores to generate signals in the sensing windings, the error detecting winding and the carry winding in a pattern representative of the binary coded decimal sum thereat, a parity checking circuit coupled to the sum digit sensing windings and to the parity winding for providing an error indication whenever an even number of signals is provided concurrently, a first error detector core threaded by all of the conductors from the first converter and operated when at least two of the conductors carry signals, a second error detector core threaded by all of the conductors from the second converter and operated when at least two of those conductors carry signals, and a sensing amplifier coupled to both of the error detector cores and providing an error indication when at least one of the error detector cores is operated.

References Cited in the file of this patent

UNITED STATES PATENTS

| | | |
|---|---|---|
| 2,838,115 | Davis | June 10, 1958 |
| 2,904,781 | Katz | Sept. 15, 1959 |

OTHER REFERENCES

Maclean et al.: A Decimal Adder Using a Stored Addition Table, vol. 105, No. 20, pages 129–135. Proceedings of the Institute of Electrical Engineers (March 1958). (Copy available in 235–175.)

Bashe: Memory Addressing Checking, I.B.M. Technical Disclosure Bulletin, vol. 1, No. 1, page 14 relied on, June 1958. (Copy available in 340–147A.)

Bloch et al.: Biased Controlled Arithmetic and Translating Matrix I.B.M. Technical Disclosure Bulletin, vol. 1, No. 2, pages 34 and 35, August 1958.